United States Patent
Steinbeiss et al.

(10) Patent No.: US 8,740,677 B2
(45) Date of Patent: Jun. 3, 2014

(54) AIR VENT

(75) Inventors: Sabine Steinbeiss, Selb (DE); Reinhard Krause, Marktreditz-Brand (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 350 days.

(21) Appl. No.: 13/081,578

(22) Filed: Apr. 7, 2011

(65) Prior Publication Data

US 2011/0250830 A1  Oct. 13, 2011

(30) Foreign Application Priority Data

Apr. 12, 2010  (DE) .......................... 10 2010 014 575

(51) Int. Cl.
*B60H 1/34* (2006.01)

(52) U.S. Cl.
USPC ............................ 454/154; 454/152; 454/155

(58) Field of Classification Search
CPC ....... F24F 13/065; B60H 1/34; B60H 1/3442; B60H 1/3435; B64D 2013/003
USPC ......................................... 454/152, 154, 155
See application file for complete search history.

(56) References Cited

U.S. PATENT DOCUMENTS

| | | | | |
|---|---|---|---|---|
| 2,462,989 A | * | 3/1949 | Mufich et al. | 454/286 |
| 2,672,806 A | * | 3/1954 | Vehige | 454/76 |
| 2,885,943 A | * | 5/1959 | Divizia | 454/154 |
| 3,366,363 A | * | 1/1968 | Hogan et al. | 251/4 |
| 3,677,474 A | * | 7/1972 | Lorenzen | 239/587.4 |
| 3,765,317 A | * | 10/1973 | Lowe | 454/286 |
| 3,802,328 A | * | 4/1974 | Kakizaki | 454/154 |
| 3,835,759 A | * | 9/1974 | Lloyd | 454/154 |
| 4,006,673 A | * | 2/1977 | Meyer et al. | 454/154 |
| 4,092,907 A | * | 6/1978 | Meyer et al. | 454/154 |
| 4,524,679 A | * | 6/1985 | Lyons | 454/286 |
| 4,716,818 A | * | 1/1988 | Brown | 454/286 |
| 4,848,669 A | * | 7/1989 | George | 239/539 |
| 4,928,582 A | * | 5/1990 | Elfverson | 454/155 |
| 5,399,119 A | * | 3/1995 | Birk et al. | 454/76 |
| 5,575,715 A | * | 11/1996 | Norbury et al. | 454/286 |
| 5,733,189 A | * | 3/1998 | Eastwood | 454/155 |
| 5,746,651 A | * | 5/1998 | Arajs et al. | 454/154 |

(Continued)

FOREIGN PATENT DOCUMENTS

| | | |
|---|---|---|
| DE | 19711656 | 9/1998 |
| DE | 202005000794 | 7/2005 |

(Continued)

*Primary Examiner* — Steven B McAllister
*Assistant Examiner* — Jonathan Cotov
(74) *Attorney, Agent, or Firm* — Tarolli, Sundheim, Covell & Tummino LLP

(57) ABSTRACT

An air vent comprising a housing and an air guiding device which is pivotally and rotatably mounted in the housing and has an outer surface having the general shape of a spherical segment, the air vent having a sliding bearing which includes a first sliding surface provided on the housing and facing the air guiding device, and a second sliding surface provided on the air guiding device, the air vent having a support arranged between the housing and the air guiding device, by means of which the air guiding device is mounted to the housing for pivotal movement about at least one swiveling axis, and the support being arranged opposite the sliding bearing in the radial direction, and a prestressing device being provided on the support, which can act on the air guiding device with a force directed against the sliding bearing.

20 Claims, 2 Drawing Sheets

(56) References Cited

U.S. PATENT DOCUMENTS

| | | | |
|---|---|---|---|
| 5,890,958 A * | 4/1999 | Greiner et al. | 454/155 |
| 5,967,891 A * | 10/1999 | Riley et al. | 454/154 |
| 6,059,653 A * | 5/2000 | Gehring et al. | 454/155 |
| 6,131,336 A * | 10/2000 | Krause et al. | 49/74.1 |
| 6,364,760 B1 * | 4/2002 | Rooney | 454/154 |
| 6,402,610 B1 * | 6/2002 | Gloisten | 454/76 |
| 6,537,146 B1 * | 3/2003 | Haynes | 454/290 |
| 6,645,065 B2 * | 11/2003 | Rooney et al. | 454/154 |
| 6,736,341 B2 * | 5/2004 | Lind | 239/587.1 |
| 6,808,451 B2 * | 10/2004 | Luik et al. | 454/155 |
| 6,887,147 B2 * | 5/2005 | Thomassin et al. | 454/71 |
| 7,044,849 B2 * | 5/2006 | Dippel | 454/143 |
| 7,070,496 B2 * | 7/2006 | Thomassin et al. | 454/71 |
| 7,288,023 B2 * | 10/2007 | Leopold | 454/152 |
| 7,527,553 B2 * | 5/2009 | Steinbeiss | 454/155 |
| 7,566,261 B2 * | 7/2009 | Ono et al. | 454/155 |
| 2002/0072321 A1 * | 6/2002 | Kowalski et al. | 454/155 |
| 2004/0043723 A1 * | 3/2004 | Mafi et al. | 454/367 |
| 2004/0063397 A1 * | 4/2004 | Dippel | 454/154 |
| 2004/0067729 A1 * | 4/2004 | Bourbon | 454/155 |
| 2004/0171344 A1 * | 9/2004 | Krause | 454/315 |
| 2005/0136823 A1 * | 6/2005 | Metz | 454/155 |
| 2005/0176364 A1 * | 8/2005 | Gehring et al. | 454/155 |
| 2005/0197056 A1 * | 9/2005 | Thomassin et al. | 454/71 |
| 2005/0239390 A1 * | 10/2005 | Leopold | 454/154 |
| 2006/0052046 A1 * | 3/2006 | Krause et al. | 454/155 |
| 2006/0063480 A1 * | 3/2006 | Neumann et al. | 454/152 |
| 2006/0172681 A1 * | 8/2006 | Steinbeiss | 454/152 |
| 2007/0163648 A1 * | 7/2007 | Eijkelenberg et al. | 137/71 |
| 2008/0289775 A1 * | 11/2008 | Lukos | 160/242 |
| 2011/0195650 A1 * | 8/2011 | Uhlenbusch | 454/152 |

FOREIGN PATENT DOCUMENTS

| | | |
|---|---|---|
| DE | 202008008891 | 2/2009 |
| EP | 2181874 | 10/2009 |
| WO | 2008128820 | 10/2008 |

* cited by examiner

AIR VENT

TECHNICAL FIELD

The invention relates to an air vent comprising a housing and an air guiding device which is pivotally and rotatably mounted in the housing and has an outer surface having the general shape of a spherical segment.

BACKGROUND OF THE INVENTION

Such air vents are known from the prior art in different configurations. They generally serve to adjust in a desired manner the volume and the direction of an air flow supplied to a vehicle interior for air-conditioning. Document WO 2008 128820 A1 discloses for example an air vent including an air guiding device which substantially has the shape of a spherical segment and is mounted in the housing via several silicone surfaces. However, in case of a longer use and due to the resulting compression or wear of the sliding surfaces, a larger play of the air guiding device in the housing can occur. A further air vent is known from DE 20 2005 000 794 U1. Here, the air guiding device is fixed via two supports, the air guiding device being rotatably and pivotally mounted in the housing. If used for a longer time, a larger play of the air guiding device can also occur in this air vent due to the abrasion of the supports and wear. Furthermore, channels are formed by the supports through which air can flow past the air guiding device and reach the interior. The object of the invention is to provide an air vent which is permanently operative and the manufacture of which is at the same time cost-effective.

BRIEF SUMMARY OF THE INVENTION

To achieve the object, an air vent is provided comprising a housing and an air guiding device which is pivotally and rotatably mounted in the housing and has an outer surface having the general shape of a spherical segment. The air vent has a sliding bearing which includes a first sliding surface provided on the housing and facing the air guiding device, and a second sliding surface provided on the air guiding device, and a support arranged between the housing and the air guiding device, by means of which the air guiding device is mounted to the housing for pivotal movement about at least one swiveling axis. The support is arranged opposite the sliding bearing in the radial direction. A prestressing device is provided on the support, which can act on the air guiding device with a force directed against the sliding bearing. The prestressing device permits to compensate for or to reduce a play of the support or of the sliding bearing produced during the use of the air vent. For this purpose, the prestressing device acts on the air guiding device with a force directed against the sliding bearing. In other words, the air guiding device is pressed against the sliding bearing by the prestressing device so that the air guiding device is mounted free of play in the housing.

The prestressing device can have a spring element, for example, which can act on the air guiding device with a force directed against the sliding bearing. The spring element constantly acts on the air guiding device with a force directed against the sliding bearing, so that a readjustment of the prestressing device is not necessary. The air guiding device is therefore permanently mounted free of play in the housing.

It is also conceivable that the prestressing device has an adjusting device by means of which the force directed against the sliding bear can be adjusted. Due to the adjusting device, a readjusting, on the one hand, of the force directed against the sliding bearing is possible when the play of the air guiding device in the housing increases, for example. On the other hand, the contact pressure of the air guiding device against the sliding bearing and thus the resistance to a rotation or pivoting of the air guiding device in the housing can be adjusted. By using an appropriate adjusting device, it is for example also possible to adjust the spring force by means of which a spring element presses against the air guiding device.

Preferably, at least one of the sliding surfaces has a sliding element made of a flexible, elastic material, in particular of a thermoplastic elastomer (TPE), thermoplastic polyurethane (TPU), silicone or natural rubber. These materials ensure, on the one hand, a low-friction sliding of the air guiding device in the housing so that a simple rotation and/or swiveling of the air guiding device is permitted. On the other hand, these materials provide a damping function due to their flexible properties so that the air guiding device can be mounted free of play in the housing.

To increase the tightness of the housing, it is possible to provide recesses in the housing and/or in the air guiding device, in which the sliding element is arranged at least partially. The air guiding device can thus be mounted in the housing with a minimum gap size so that no gap or only a very small gap is present between the housing and the air guiding device, which prevents or considerably reduces a leakage flow.

The support includes, for example, a rail and a slider shiftable on the rail. The rail is preferably configured so as to be curved so that it can be mounted in the gap between the air guiding device and the housing. The slider is shifted on the rail when the air guiding device is swiveled.

The slider is for example attached to the air guiding device. In this case, the rail is firmly mounted to the housing in the shifting direction of the slider so that the slider is shifted on the rail when the air guiding device is swiveled.

To ensure an additional mobility of the air guiding device, the support has for example a swivel pin about which the air guiding device can be swiveled. The swivel axis of the swivel pin is preferably perpendicular to the swivel axis of the rail and of the slider mounted in the rail, so that the air vent has a large adjusting range.

The swivel pin preferably couples the rail with the housing which means that the rail is rotatably or pivotally mounted in the housing through the swivel pin.

To prevent the air from flowing past the air guiding device through the gap between the air guiding device and the housing, a sealing element can be provided between the housing and the air guiding device. This sealing element has for example an annular configuration so that it covers the entire gap between the housing and the air guiding device.

DETAILED DESCRIPTION OF THE PREFERRED EMBODIMENTS

Figure 1:
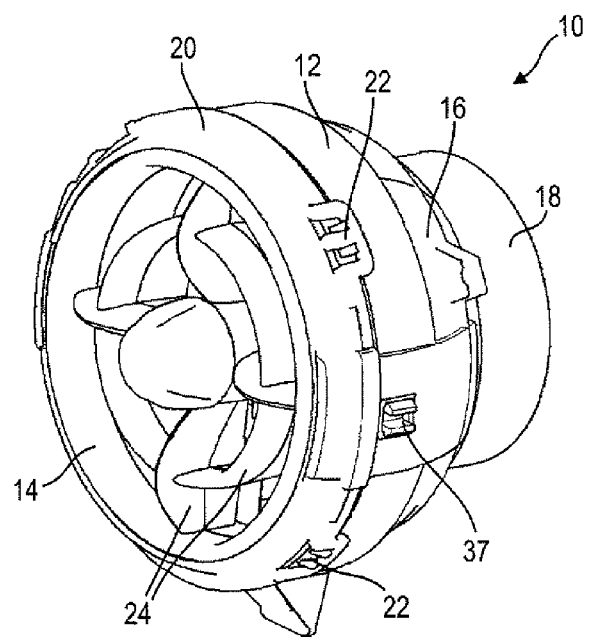
FIG. 1 shows a perspective view of an air vent according to the invention.

The air vent 10 shown in FIG. 1 has a housing 12 in which an air guiding device 14 is pivotally mounted with respect to a longitudinal axis A of the air vent 10. The housing 12 is formed by a first housing part 16 and a second housing part 20. The first housing part 16 contains a substantially hemispherical inner surface 17 (see also FIG. 2), and a connection 18 for connecting the air vent 10 to a ventilation channel. The second housing part 20 of the housing 12 has an annular configuration and can be mounted to the first housing part 16 by means of a plurality of latching connections 22.

The air guiding device 14 is substantially formed so as to have the shape of a spherical segment and has a plurality of vanes 24 for deflecting an air flow, which are arranged in a concentric and radial manner. In a first mounting step, the air guiding device 14 is inserted in the first housing part 16 and is then fixed by placing the second housing part thereon. A sealing element 21 is provided on the second housing part 20, which is adapted to seal the gap between the housing 12 and the air guiding device 14.

The air vent 10 has a support 26 and a sliding bearing 28 arranged opposite the support in the radial direction R in order to mount the air guiding device 14 in the housing for pivoting movement with respect to the longitudinal axis A of the air vent 10.

Figure 3:
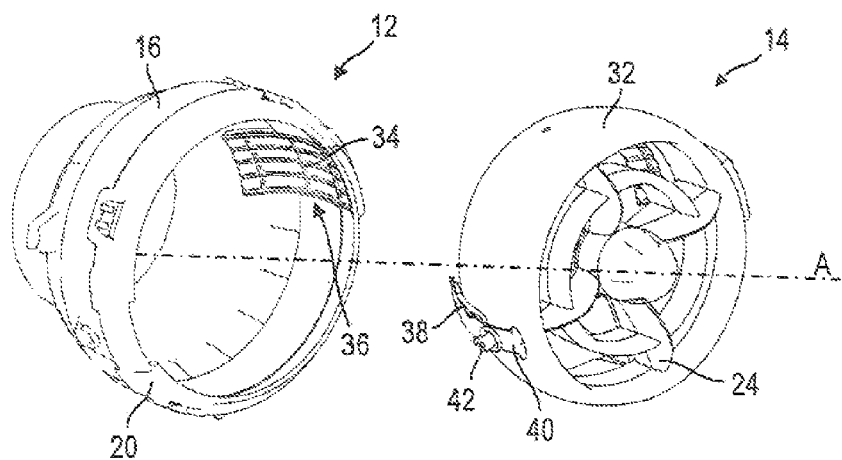
FIG. 3 shows a second exploded view of the air vent of FIG. 1.

Here, the sliding bearing 28 has a first sliding surface 30 provided on the inner surface 17 of the housing 12, and a second sliding surface 32 which in the present case corresponds to the outer surface of the air guiding device 14. The first sliding surface 30 is formed at a sliding element 34 which in the present case is made of a silicone material and is elastically deformable. As can be seen in FIG. 3, a recess 36 is provided in the housing 12, in which the sliding element 34 is attached by means of a latching connection 37 so that the sliding element 34 projects only to a minimum extent from the inner surface 17 of the housing 12.

The support 26 has a slider 38 which is attached to the air guiding device 14, and a rail 40 which is pivotally mounted to the housing 12 through a swivel pin 42.

Figure 2:
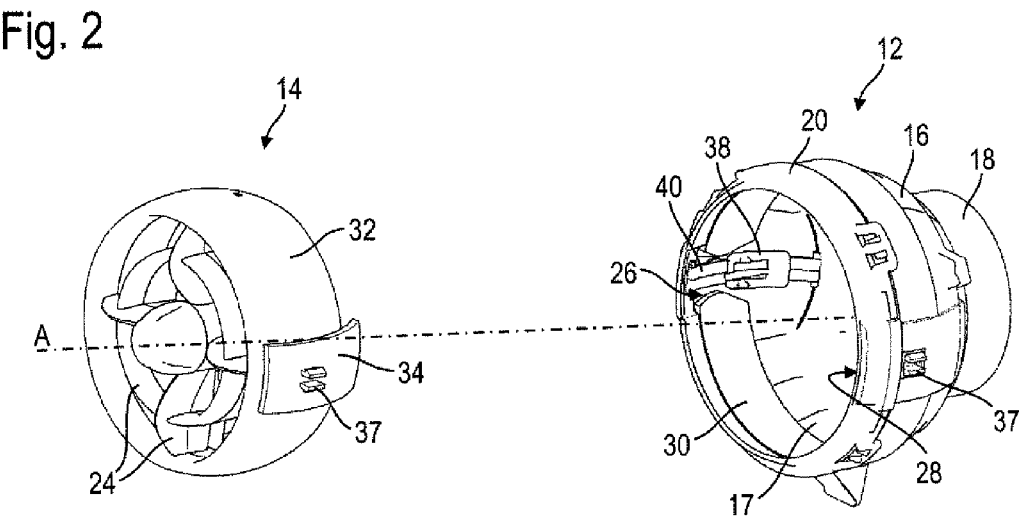
FIG. 2 shows a first exploded view of the air vent of FIG. 1.

By shifting the slider 38 on the rail 40, the air guiding device 14 can be swiveled in a horizontal direction with respect to FIG. 2. Due to the swivel pin 42, the air guiding device can be swiveled vertically with respect to FIG. 2. The mobility of a cardanic mounting having two swivel axes that are perpendicular to each other is thus provided, by means of which the air guiding device 14 can be swiveled in any desired direction.

Figure 4:
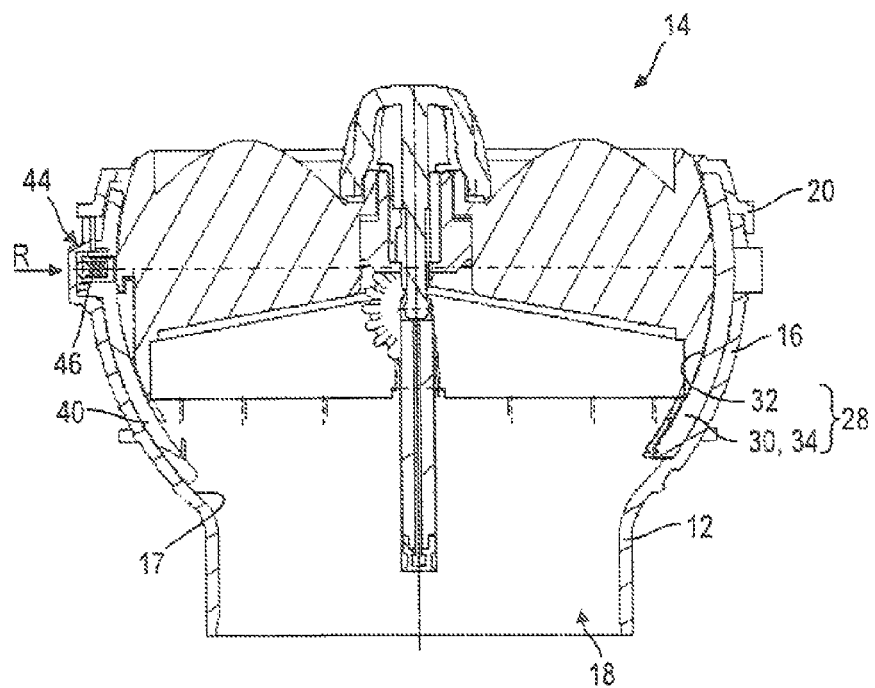
FIG. 4 shows a sectional view through the air vent of FIG. 1.

As can be seen in particular in FIG. 4, the support 26 permits a mobility in the radial direction R so that the position of the air guiding device 14 with respect to the sliding surface 30 is variable. The air guiding device 14 can in particular be urged against the sliding surface 30. A prestressing device 44 is provided for this purpose on the support 26. The prestressing device 44 has a spring 46 which is adapted to act on the air guiding device 14 with a force directed in the radial direction R against the sliding bearing. Due to the action on the air guiding device 14 with a force directed against the sliding bearing 28, a possible play between the air guiding device 14 and the housing 12 can be compensated for. The air guiding device 14 is thus mounted free of play through the support 26 and the sliding bearing 28.

The prestressing device 44 can for example include a spring element which can constantly act on the air guiding device 14 with a force directed against the sliding bearing 28. It is however also conceivable that the prestressing device 44 has an adjusting device which can set the spring force or adjust the position of the support 26 with respect to the sliding bearing 28. It can also be provided that the slider 38 is configured so as to be curved, for example, so that it can elastically urge the air guiding device 14 against the sliding bearing 28.

Other support types are also conceivable instead of the embodiment of the support 26 shown here.

Instead of the silicone used here, it is also possible to use other flexible, elastic materials having good sliding properties, such as TPE, TPU or natural rubber, for example. It is also conceivable that the sliding element is fixed to the air guiding device 14.

The invention claimed is:

1. An air vent (10) comprising
a housing (12) and an air guiding device (14) which is pivotally and rotatably mounted in the housing (12) and has an outer surface having the general shape of a spherical segment,
the air vent (10) having a sliding bearing (28) which includes a first sliding surface (30) provided on the housing (12) and facing the air guiding device (14), and a second sliding surface (32) provided on the air guiding device (14),
the air vent (10) having a support (26) arranged between the housing (12) and the air guiding device (14), by means of which the air guiding device (14) is mounted to the housing (12) for pivotal movement about at least one swiveling axis, the support is movable with respect to the housing, and
the support (26) being arranged opposite the sliding bearing (28) in a radial direction (R), and a prestressing device (44) being provided on the support (26), which can act on the air guiding device (14) with a force directed against the sliding bearing (28) such that the air guiding device (14) is biased towards the sliding bearing (28).

2. The air vent according to claim 1, wherein said prestressing device (44) extends through the support (26) and has a spring element which is adapted to act on the air guiding device (14) with a force directed against the sliding bearing (28).

3. The air vent according to claim 1, wherein said prestressing device (44) has an adjusting device by means of which the force directed against the sliding bearing (28) can be adjusted.

4. The air vent according to claim 1, wherein at least one of said sliding surfaces (30,32) has a sliding element (34) made of a flexible, elastic material, in particular of a thermoplastic elastomer (TPE), thermoplastic polyurethane (TPU), silicone or natural rubber.

5. The air vent according to claim 4, wherein a recess (36) in which the sliding element (34) is arranged at least partially is provided on the housing (12) and/or on the air guiding device (14).

6. The air vent according to claim 1, wherein said support (26) has a rail (4) and a slider (38) shiftably mounted to the rail (40).

7. The air vent according to claim 6, wherein said slider (38) is attached to the air guiding device (14).

8. The air vent according to claim 1, wherein said support (26) has a swivel pin (42) about which the air guiding device (14) can be swiveled.

9. The air vent according to claim 8, wherein said swivel pin (42) couples the rail (40) with the housing (12).

10. The air vent according to claim 1, wherein the support (26) includes a swivel pin (42) that defines the swiveling axis, the swiveling axis intersecting the sliding bearing (28).

11. The air vent according to claim 1, wherein the force of the prestressing device (44) is directed radially towards the center of the air guiding device (14).

12. The air vent according to claim 4, wherein the sliding element (34) has a spherically shaped surface that defines the first sliding surface (30).

13. The air vent according to claim 1, wherein the support (26) is spaced from the sliding bearing (28) in the radial direction (R) extending perpendicular to a longitudinal axis (A) of the housing (12).

14. An air vent (10) comprising:
a housing (12) having a longitudinal axis (A);
an air guiding device (14) mounted in the housing (12) and having a spherically shaped outer surface;
a sliding bearing (28) including a first sliding surface (30) connected to the housing (12) and facing the air guiding device (14) and a second sliding surface (32) connected to the air guiding device (14) and engaging the first sliding surface (30);
a support (26) spaced from the sliding bearing (28) and provided between the housing (12) and the air guiding device (14), the support (26) being diametrically opposed from the sliding bearing (28) about the longitudinal axis (A) of the housing (12), the support (26) supporting the air guiding device (14) for pivotal movement relative to the housing (12) about a swiveling axis, the support is movable with respect to the housing; and
a prestressing device (44) connected to the support (26) and applying a biasing force on the air guiding device (14) in a direction transverse to the longitudinal axis (A) of the housing (12) and toward the sliding bearing (28) such that the air guiding device (14) is biased towards the sliding bearing (28).

15. The air vent according to claim 14, wherein the swiveling axis extends transverse to the longitudinal axis (A) of the housing (12).

16. The air vent according to claim 14, wherein the support (26) includes a swivel pin (42) that defines the swiveling axis, the swiveling axis intersecting the sliding bearing (28).

17. The air vent according to claim 14, wherein the biasing force of the prestressing device (44) is directed radially towards the center of the air guiding device (14).

18. An air vent (10) comprising:
a housing (12) having a longitudinal axis (A);
an air guiding device (14) mounted in the housing (12) and having a spherically shaped outer surface;
a sliding bearing (28) including a first spherical sliding surface (30) connected to the housing (12) and facing the air guiding device (14) and a second spherical sliding surface (32) connected to the air guiding device (14) and engaging the first sliding surface (30);
a support (26) spaced from the sliding bearing (28) and provided between the housing (12) and the air guiding device (14), the support (26) and the sliding bearing (28) being diametrically opposed from one another about the longitudinal axis (A), the support (26) supporting the air guiding device (14) for pivotal movement relative to the housing (12) about a swiveling axis extending perpendicular to the longitudinal axis (A) and intersecting the sliding bearing (28), the support (26) including a rail (40) pivotally mounted to the housing (12) through a swivel pin (42) and a slider (38) connected to the air guiding device (14) for sliding along the rail (40); and
a prestressing device (44) connected to the support (26) and applying a biasing force on the air guiding device (14) in a direction transverse to the longitudinal axis (A) of the housing (12) and toward the sliding bearing (28) such that the air guiding device (14) is biased towards the sliding bearing (28).

19. The air vent according to claim 1, wherein the air vent (10) pivots about the at least one swiveling axis relative to the first sliding surface (30) on the housing (12).

20. The air vent according to claim 14, wherein the air vent (10) pivots about the at least one swiveling axis relative to the first sliding surface (30) on the housing (12).

\* \* \* \* \*